United States Patent
Wang

(10) Patent No.: US 10,697,194 B2
(45) Date of Patent: Jun. 30, 2020

(54) LIGHT-EMITTING WARNING ROPE

(71) Applicant: PROFILM MATERIALS LTD., Tainan (TW)

(72) Inventor: Ching Wang, Tainan (TW)

(73) Assignee: Profilm Materials Ltd., Tainan (TW)

( * ) Notice: Subject to any disclaimer, the term of this patent is extended or adjusted under 35 U.S.C. 154(b) by 0 days.

(21) Appl. No.: 15/960,996

(22) Filed: Apr. 24, 2018

(65) Prior Publication Data

US 2018/0328071 A1    Nov. 15, 2018

(30) Foreign Application Priority Data

May 11, 2017   (TW) ............................. 106206699 A

(51) Int. Cl.
  *E04H 15/10*   (2006.01)
  *D04C 1/12*    (2006.01)
  (Continued)

(52) U.S. Cl.
  CPC ............... *E04H 15/10* (2013.01); *D04C 1/12* (2013.01); *D07B 1/148* (2013.01); *E04H 15/32* (2013.01); *F21V 9/30* (2018.02); *F21V 15/04* (2013.01); *F21V 23/001* (2013.01); *F21V 33/008* (2013.01); *G02B 6/001* (2013.01); *D07B 2201/1096* (2013.01); *D07B 2501/2069* (2013.01); *D10B 2401/20* (2013.01);
  (Continued)

(58) Field of Classification Search
  CPC .. G02B 6/0006; G02B 6/0008; G02B 6/0003; G02B 6/001; D07B 1/14; E04H 15/32; D04C 1/12; F21V 9/30; F21V 15/01; F21V 23/001; F21V 33/008
  See application file for complete search history.

(56) References Cited

U.S. PATENT DOCUMENTS

| | | | |
|---|---|---|---|
| 6,382,825 B1 * | 5/2002 | Wainwright | E04H 15/10 362/145 |
| 7,021,808 B2 * | 4/2006 | Currie | G02B 6/001 362/551 |

(Continued)

FOREIGN PATENT DOCUMENTS

| | | | |
|---|---|---|---|
| CN | 20162786 | * | 5/2008 |
| CN | 201202052 Y | | 3/2009 |

(Continued)

*Primary Examiner* — Anabel Ton
(74) *Attorney, Agent, or Firm* — Winston Hsu

(57) ABSTRACT

A light-emitting warning rope is provided with one end connected to a tent and other end connected to an anchoring point. The light-emitting warning rope is disposed between the anchoring point and the tent to provide a tension to set the tent upright. The rope comprises a light-emitting core and a structural rope. The structural rope comprises a plurality of bearing yarns which is knitted into a strip body with the light-emitting core as an axis, and the strip body knitted by each bearing yarn is knitted in a mesh shape on the radial side and has a plurality of gaps through which light from the light-emitting core is transmitted. In any segment of the rope, the light-emitting core has a stretching length less than that of each bearing yarn, so that the axial tension acts substantially on the bearing yarns when the rope suffers an axial tension.

6 Claims, 8 Drawing Sheets

(51) Int. Cl.
*E04H 15/32* (2006.01)
*F21V 9/30* (2018.01)
*D07B 1/14* (2006.01)
*F21V 15/04* (2006.01)
*F21V 23/00* (2015.01)
*F21V 33/00* (2006.01)
*F21V 8/00* (2006.01)
*E04H 12/20* (2006.01)
*E04H 15/64* (2006.01)
*E04H 15/62* (2006.01)
*F21W 131/10* (2006.01)

(52) U.S. Cl.
CPC ...... *D10B 2403/0243* (2013.01); *E04H 12/20* (2013.01); *E04H 15/62* (2013.01); *E04H 15/64* (2013.01); *F21W 2131/10* (2013.01)

(56) References Cited

U.S. PATENT DOCUMENTS

| | | | |
|---|---|---|---|
| 7,021,809 B2* | 4/2006 | Iwasa | F21S 2/00 362/23.01 |
| 9,429,731 B2* | 8/2016 | Bookbinder | G02B 6/4482 |
| 2003/0206419 A1* | 11/2003 | Longatti | D04C 1/12 362/551 |
| 2006/0087830 A1* | 4/2006 | Kelly | G02B 6/0005 362/84 |
| 2017/0080088 A1* | 3/2017 | Savariar | A61K 41/0038 |

FOREIGN PATENT DOCUMENTS

| | | |
|---|---|---|
| CN | 201553933 U | 8/2010 |
| CN | 205382358 U | 7/2016 |
| CN | 106120413 A | 11/2016 |

* cited by examiner

LIGHT-EMITTING WARNING ROPE

FIELD OF THE INVENTION

The present invention relates to a light-emitting warning rope, and in particular, to a light-emitting warning rope capable of withstanding a tension.

BACKGROUND OF THE INVENTION

The conventional tent consists of brackets, ropes, curtains and other components, wherein the rope is fixed between an anchoring point and the tent to provide the tent a stable supporting force. A user can nail camp nails into the ground to form anchoring points or bind the rope to a surrounding steady object such as a trunk. A camping site is usually located on the outskirts of a city or in the mountains. These locations often lack lighting. At night, campers will find it difficult to perceive where the camp rope is located. Occasionally, accidents occur in the case that the campers are stumbled and injured by ropes. In this regard, referring to FIG. 1, a cold cathode fluorescent lamp (CCFL) is used to fabricate a soft luminescent tube 900 in the prior art. The luminescent tube 900 is wound around the camp rope 800 and emits cold light through power to warn the user about a position where the camp rope 800 is located. However, the luminescent tube 900 will have potential safety hazards in case of accidentally leaking because of the presence of mercury. In addition, the luminescent tube 900 is an additional device which is hardly integrated with the camp rope 800 and is thus not easy to use. Because the luminous efficiency of the luminescent tube 900 is not ideal, it must waste a lot of power if exhibit sufficient brightness is exhibited. Therefore, it is necessary to make improvements on the prior art.

SUMMARY OF THE INVENTION

An objective of the present invention is to overcome the defects that the conventional luminescent tube is possible to endanger health in the presence of mercury, lacks integrity with a camp rope and has low luminous efficiency, and the like.

In order to achieve said objective, the present invention provides a light-emitting warning rope, wherein one end of the light-emitting warning rope is connected to a tent, and the other end thereof is connected to an anchoring point; the light-emitting warning rope is disposed between the anchoring point and the tent to provide a tension to erect the tent; the light-emitting warning rope comprises a light-emitting core and a structural rope; the structural rope comprises a plurality of bearing yarns which is knitted into a strip body with the light-emitting core as an axis, and the strip body knitted by each of the bearing yarns is knitted in a mesh shape on the radial side and has a plurality of gaps for the light emitted from the light-emitting core being transmitted through; the length of the light-emitting core is less than the length of each of the unwound bearing yarns in any segment of the light-emitting warning rope, so that the plurality bearing yards preferentially sustain the axial tension force when the light-emitting warning rope 100 suffers an axial tension.

Further, the structural rope comprises a plurality of outer covering yarns which is knitted into a strip body with the plurality of bearing yarns as an axis, and the strip body knitted by each of the plurality of outer covering yarns is knitted in a mesh shape on the radial side and has a plurality of gaps for the light emitted from the light-emitting core being transmitted through.

Further, the outer covering yarns include a fluorescent dye or a light-absorbing material.

Further, the structural rope includes a light-transmitting sleeve; the light-emitting core and each of the plurality of bearing yarns are inserted inside the light-transmitting sleeve, and each of the plurality of outer covering yarns is wrapped around the outside of the light-transmitting sleeve.

Further, the light-emitting core includes a light guide strip and a plurality of luminous points provided in the light guide strip at intervals.

Further, the light-emitting core includes a first power line, a second power line provided side by side with the first power line, and a plurality of light-emitting components connected across the first power line and the second power line.

Further, the structural rope includes a plurality of reinforcing cables provided side by side with the light-emitting core; each of the plurality of bearing yarns is knitted into a strip body with the light-emitting core and each of the plurality of reinforcing cables as an axis; the reinforcing cable has a stretching length slightly larger than that of the light-emitting core in any segment of the light-emitting warning rope.

Therefore, the light-emitting warning rope of the present invention can withstand a tension through the bearing yarns, and can thus be used directly as a camp rope. The light-emitting core provides an indication light source, thereby reducing the possibility that a user is stumbled by the camp rope at night.

DETAILED DESCRIPTION OF THE PREFERRED EMBODIMENTS

Figure 1:
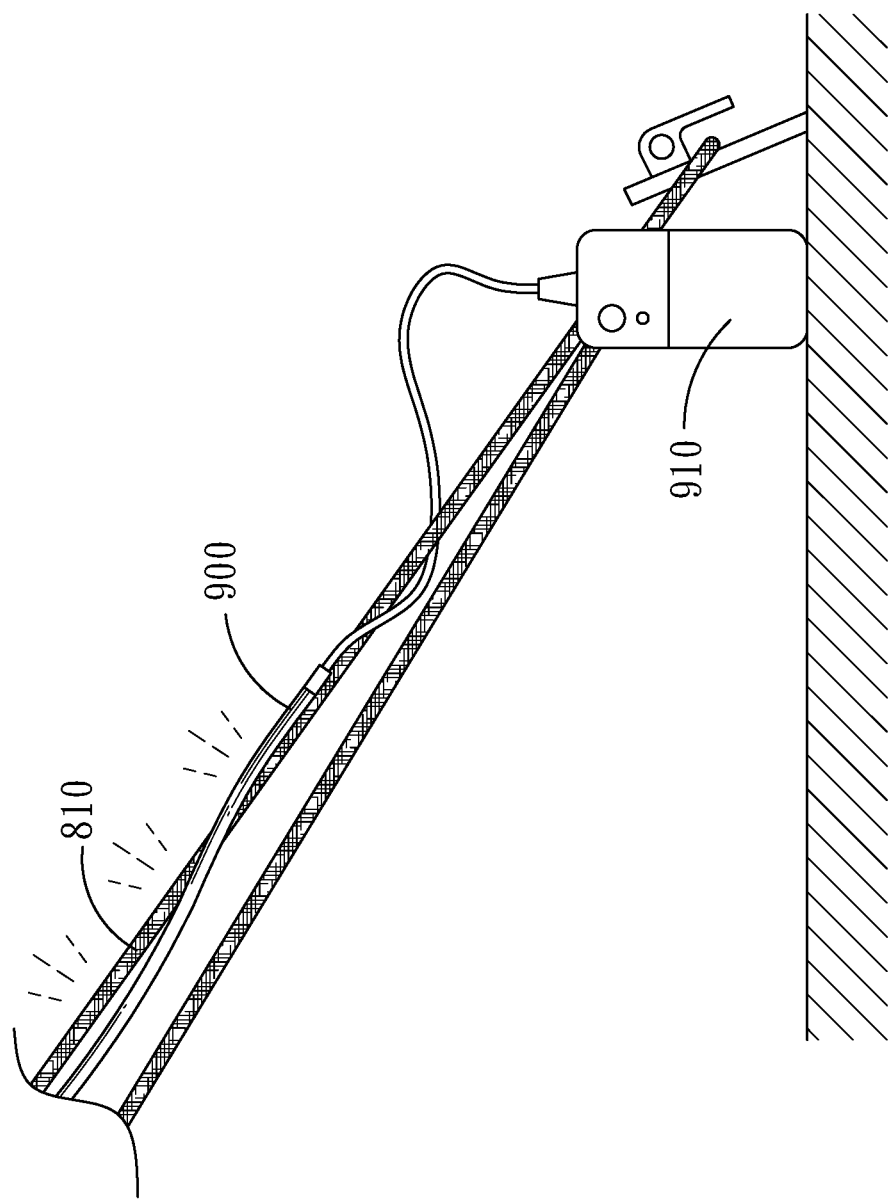
FIG. 1 is a schematic diagram of a conventional camp rope warning device while using.
Figure 2:
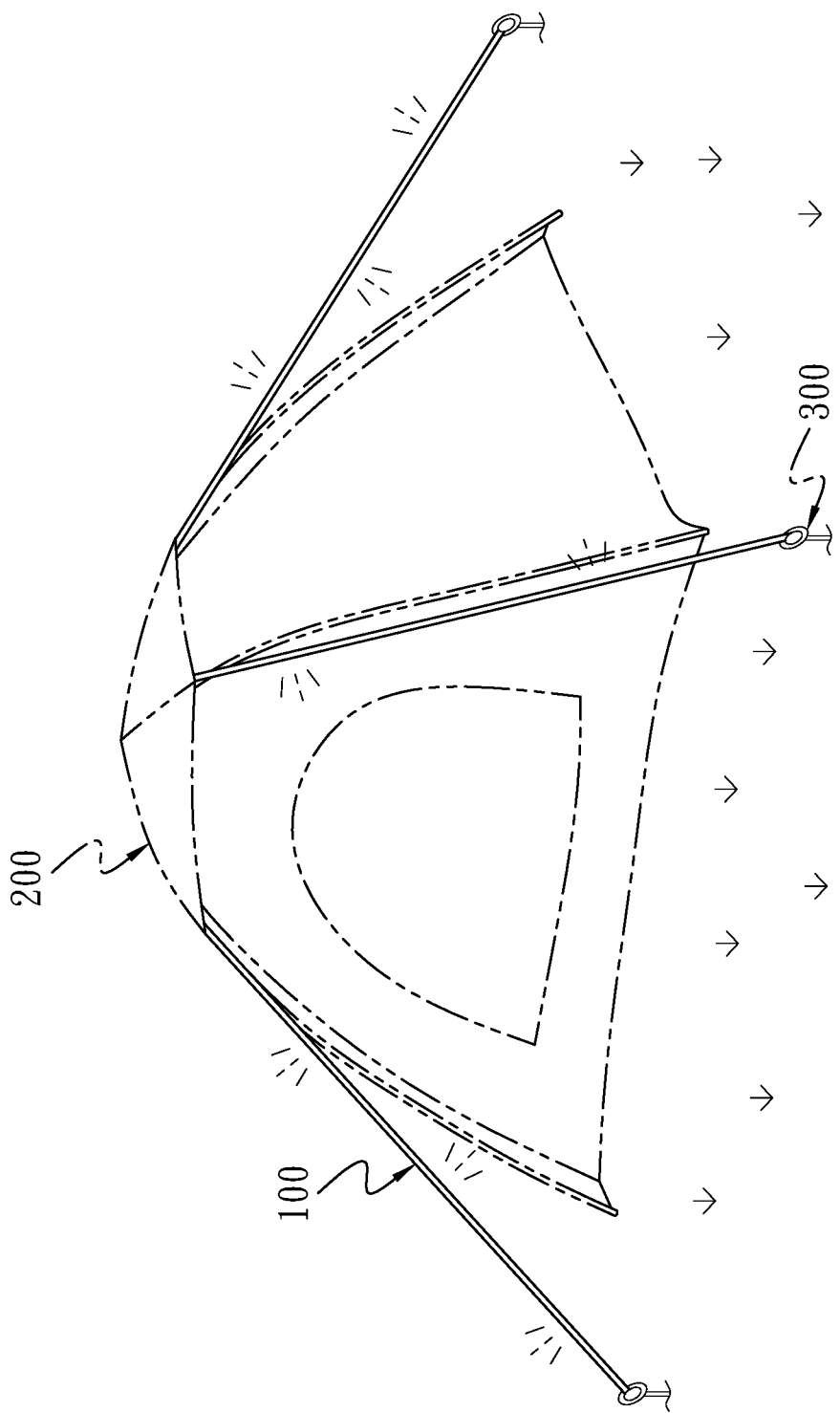
FIG. 2 is a schematic diagram of a first embodiment of the present invention while using.
Figure 3:
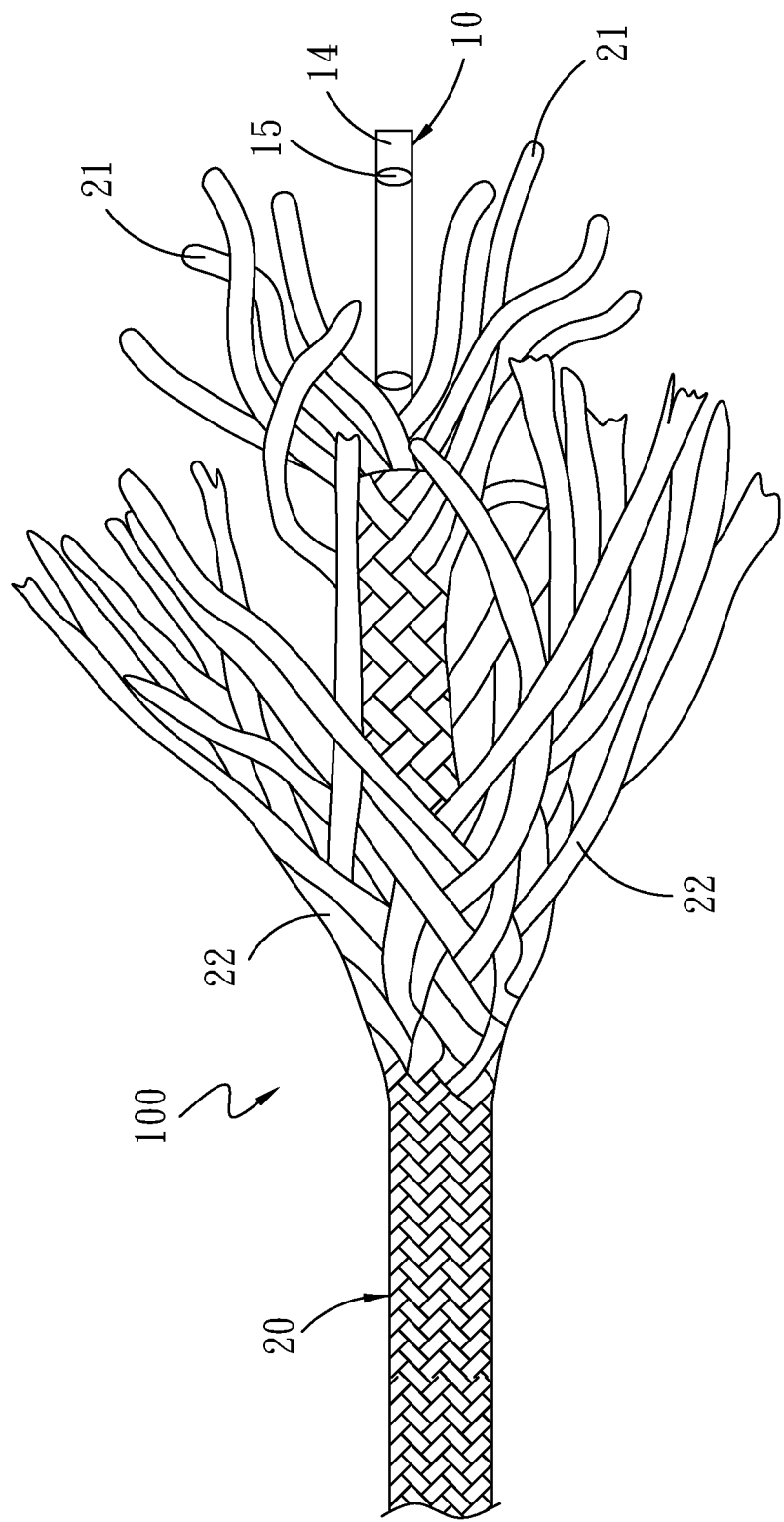
FIG. 3 is a partial exploded view of the first embodiment of the present invention.
Figure 4:
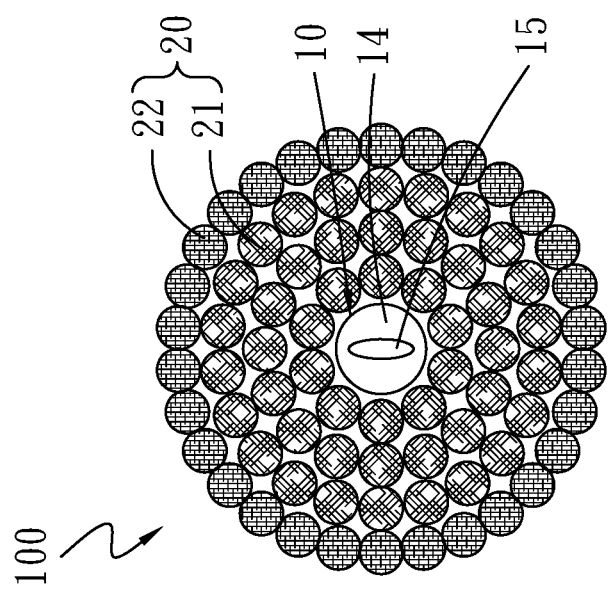
FIG. 4 is a cross-sectional side view of the first embodiment of the present invention.
Figure 5:
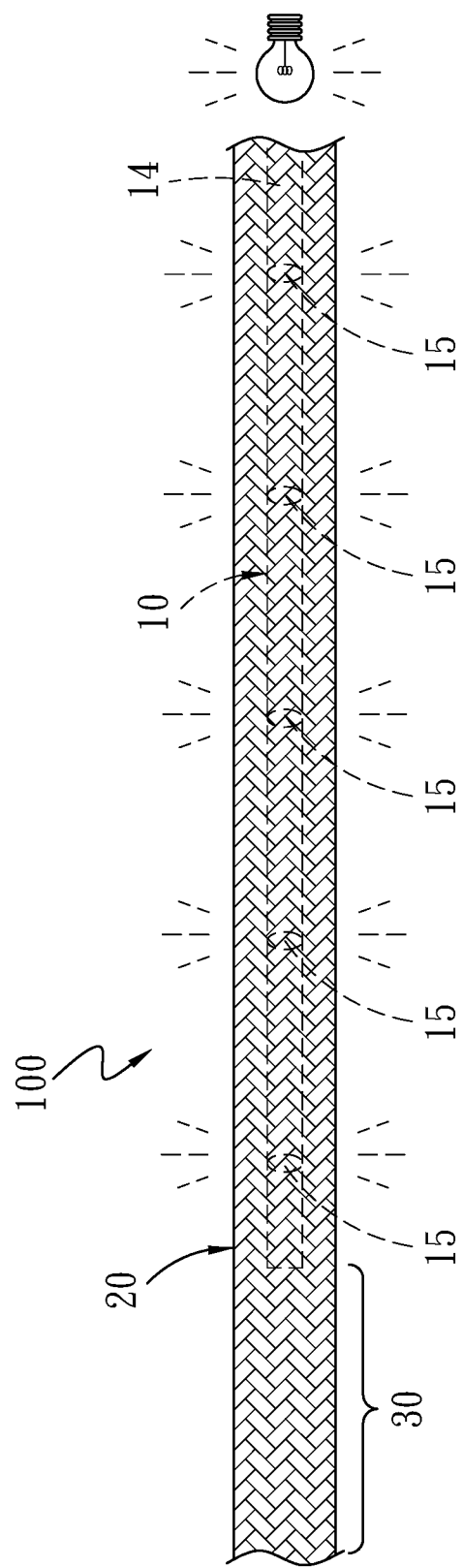
FIG. 5 is a combined view of the first embodiment of the present invention.

Referring to FIG. 2, FIG. 3, FIG. 4, and FIG. 5, in the present embodiment, the present invention provides a light-emitting warning rope 100 which mainly comprises a light-emitting core 10 and a structural rope 20. One end of the light-emitting warning rope 100 is connected to a tent 200, and the other end thereof is connected to an anchoring point 300. The light-emitting warning rope 100 is disposed between the anchoring point 300 and the tent 200 to provide a tension to erect the tent 200.

Specifically, in the present embodiment, the light-emitting core 10 includes a light guide strip 14 made of a light guide material, such as optical fiber, and a plurality of luminous points 15 disposed in the light guide strip 14 at intervals for scattering light. In the presence of another available light source, a user may connect one end of the light guide strip 14 to another light source, so that the light is scattered when passing through each of the luminous points 15 to achieve the effect of warning the position of a camp rope.

The structural rope 20 comprises a plurality of bearing yarns 21 which is knitted into a strip body with the light-emitting core 10 as an axis, and the strip body knitted by each of the bearing yarns 21 is knitted in a mesh shape on the radial side and has a plurality of gaps. Light emitted from the light-emitting core 10 is transmitted through the plurality of gaps. Each of the plurality of bearing yarns 21 is wound around the periphery of the light-emitting core 10 in any segment of the light-emitting warning rope 100. Therefore, the length of the light-emitting core 10 is less than the length of each of the unwound bearing yarns 21, and the axial tension acts substantially on the bearing yarns 21 when the light-emitting warning rope 100 suffers an axial tension. In addition, the ends of the structural rope 20 may include a remaining segment 30. The remaining segment 30 is specifically a portion of a column wounded by the plurality of bearing yarns 21 excluding the light-emitting core 10, in order to ensure that the plurality of bearing yards 21 preferentially sustain the axial tension force when both ends of the light-emitting warning rope 100 suffers an axial tension, and avoid the light-emitting core 10 from being torn off. Through the above-mentioned structure, the present invention utilizes the light-emitting core 10 to provide an indication light source, and utilizes each of the plurality of bearing yarns 21 as a force-bearing structure, thereby achieving the purpose of warning the position of the camp rope under the condition of suffering the tension.

Moreover, the structural rope 20 comprises a plurality of outer covering yarns 22 which is knitted into a strip body with the plurality of bearing yarns 21 as an axis, and the strip body knitted by each of the outer covering yarns 22 is knitted in a mesh shape on the radial side and has a plurality of gaps. Light emitted from the light-emitting core 10 is transmitted through the plurality of gaps. The plurality of outer covering yarns 22 serving as the outermost layer of the structural rope 20, which contains a fluorescent dye or a light absorbing material (such as long-afterglow rare earth fiber) to enhance its warning effect.

Figure 6:
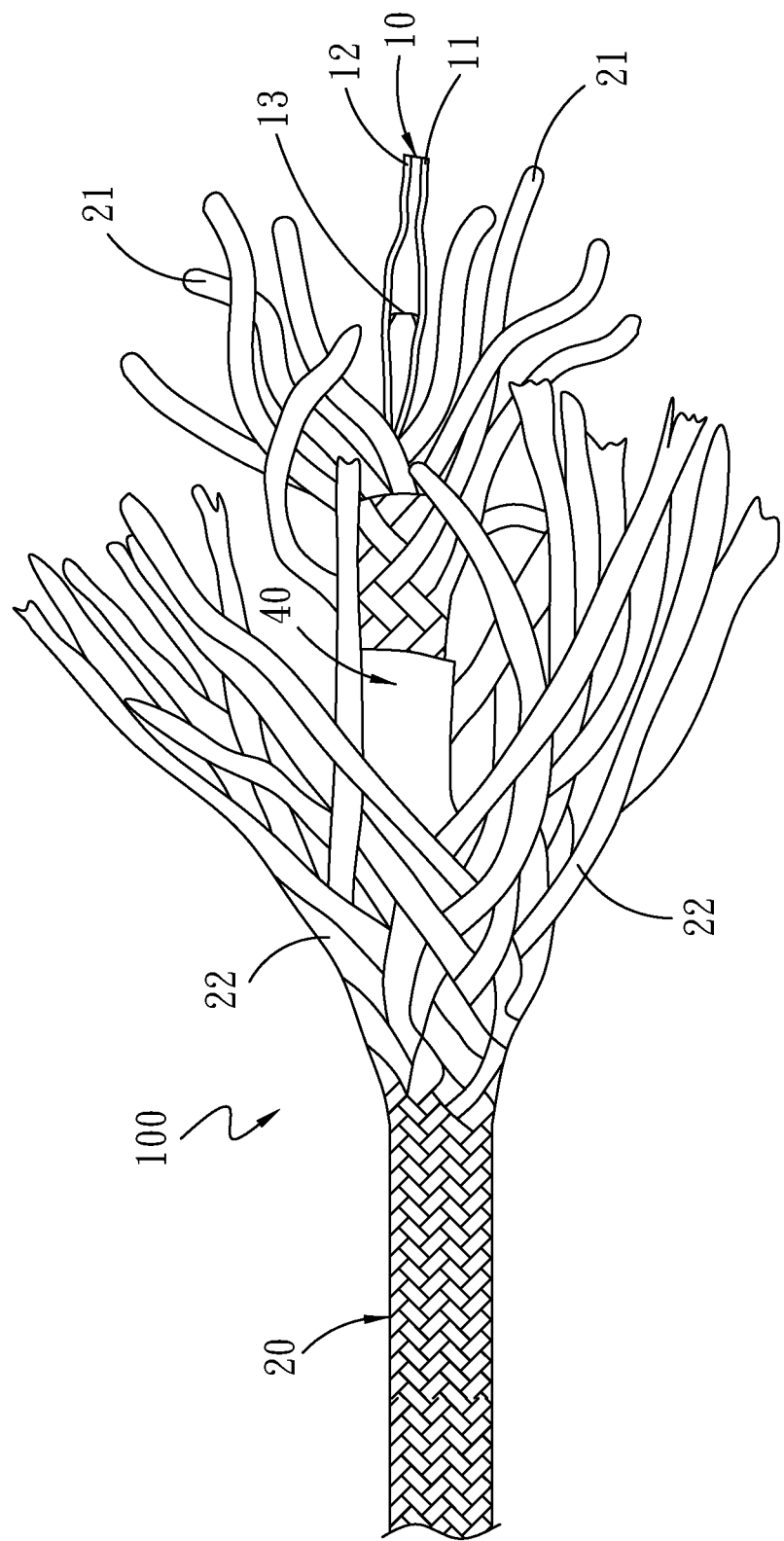
FIG. 6 is a partial exploded view of a second embodiment of the present invention.
Figure 7:
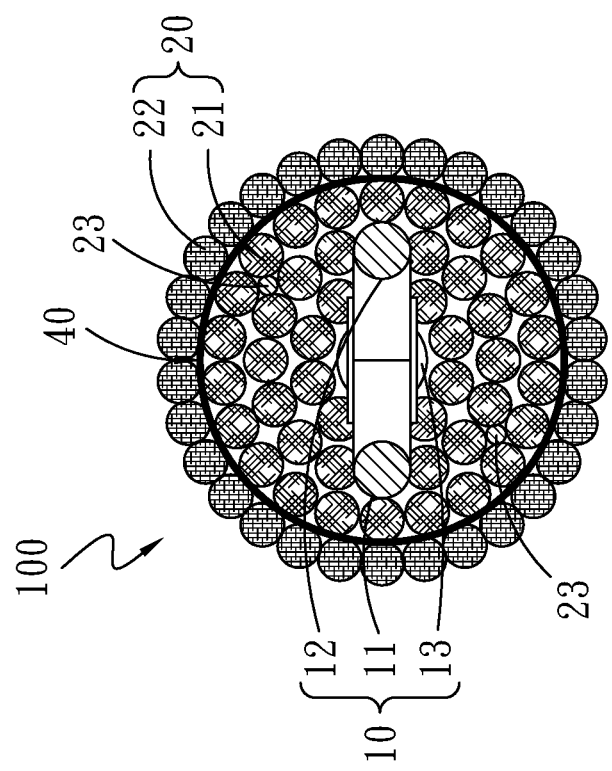
FIG. 7 is a cross-sectional side view of the second embodiment of the present invention.

FIG. 6 and FIG. 7 illustrate a second embodiment of the present invention. In the second embodiment, the light-emitting core 10 includes a first power line 11, a second power line 12 provided side by side with the first power line 11, and a plurality of light-emitting components 13 connected across the first power line 11 and the second power line 12. A light source of each of the light-emitting components 13 is disposed toward the radial direction of the light-emitting core 10. Because it is difficult to get a large amount of power in a camping area, each of the light-emitting components 13 is preferably a light-emitting diode, which has the advantages of being driven by a weak current and energy-saving. Furthermore, the structural rope 20 includes a light-transmitting sleeve 40. The light-emitting core 10 and each of the bearing yarns 21 are inserted inside the light-transmitting sleeve 40, and each of the outer covering yarns 22 is wrapped around the outside of the light-transmitting sleeve 40. In this way, the light-transmitting sleeve 40 may serve as a waterproof layer for protecting the light-emitting core 10. In addition, because each of the light-emitting components 13 has a thickness, so that grainy protrusions are generated on the surface of each of the outer covering yarns 22. The coverage of the light-transmitting sleeve 40 also has the benefit of making the light-emitting warning rope 100 more smooth in appearance and touch.

Figure 8:
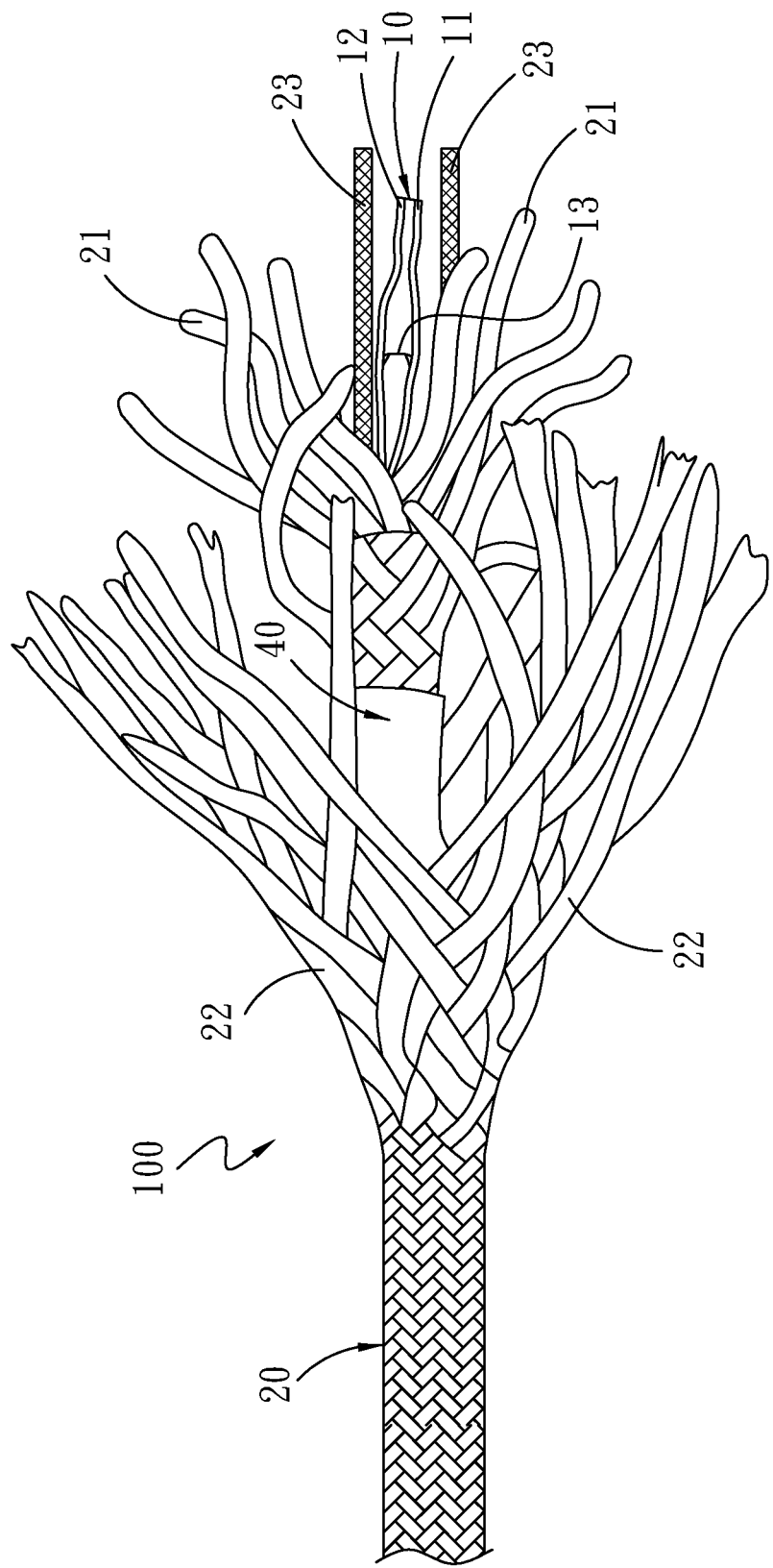
FIG. 8 is a partial exploded view of a third embodiment of the present invention.

FIG. 8 illustrates a third embodiment of the present invention. In order to improve the tensile strength of the structural rope 20, the structural rope 20 may include a plurality of reinforcing cables 23 provided side by side with the light-emitting core 10. Each of the bearing yarns 21 is knitted into a strip body with the light-emitting core 10 and each of the reinforcing cables 23 as an axis. In addition, the reinforcing cable 23 has a stretching length slightly larger than that of the light-emitting core 10 in any segment of the light-emitting warning rope 100. Each of the reinforcing cables 23 may be made of a material the same as each of the bearing yarns 21, or may be made of a material with higher structural strength such as a metal wire.

What is claimed is:

1. A light-emitting warning rope, wherein one end of the light-emitting warning rope is connected to a predetermined point of a tent, and the other end of the light-emitting warning rope is connected to a predetermined anchoring point, at least two light-emitting warning ropes provide an axial tension to erect the tent; and the light-emitting warning rope comprises:

a light-emitting core; and a structural rope, comprising a plurality of bearing yarns which are knitted into a tubular braid with the light-emitting core as an axis and a plurality of outer covering yarns which is knitted into a tubular braid with the plurality of bearing yarns as an axis, the tubular braid knitted by each of the plurality of bearing yarns is knitted in a mesh shape and has a plurality of gaps for light emitted from the light-emitting core being transmitted through, and the tubular braid knitted by each of the plurality of outer covering yarns is knitted in a mesh shape and has a plurality of gaps for the light emitted from the light-emitting core being transmitted through;

wherein the length of the light-emitting core is less than the length of each of the unwound bearing yarns in any segment of the light-emitting warning rope, the plurality of bearing yarns preferentially sustain the axial tension when the light-emitting warning rope is disposed between the predetermined point of the tent and the predetermined anchoring point.

2. The light-emitting warning rope according to claim 1, wherein the plurality of outer covering yarns include a fluorescent dye or a light-absorbing material.

3. The light-emitting warning rope according to claim 1, wherein the structural rope includes a light-transmitting sleeve; the light-emitting core and each of the plurality of bearing yarns is inserted inside the light-transmitting sleeve, and each of the plurality of outer covering yarns is wrapped around the outside of the light-transmitting sleeve.

4. The light-emitting warning rope according to claim 1, wherein the light-emitting core includes a light guide strip and a plurality of luminous points provided in the light guide strip at intervals.

5. The light-emitting warning rope according to claim 1, wherein the light-emitting core includes a first power line, a second power line provided side by side with the first power line, and a plurality of light-emitting components connected across the first power line and the second power line.

6. The light-emitting warning rope according to claim 1, wherein the structural rope includes a plurality of reinforcing cables provided side by side with the light-emitting core; each of the plurality of bearing yarns is knitted into a tubular braid with the light-emitting core and each of the plurality of reinforcing cables as an axis; the length of each of the plurality of reinforcing cables is slightly larger than the length of the light-emitting core in any segment of the light-emitting warning rope.

\* \* \* \* \*